(12) United States Patent
Tran et al.

(10) Patent No.: US 8,797,684 B1
(45) Date of Patent: Aug. 5, 2014

(54) MAGNETIC WRITER CONFIGURED FOR HIGH DATA RATE RECORDING

(75) Inventors: Ut Tran, San Jose, CA (US); Zhigang Bai, Milpitas, CA (US); Kevin K. Lin, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 26 days.

(21) Appl. No.: 13/331,020

(22) Filed: Dec. 20, 2011

(51) Int. Cl.
*G11B 5/17* (2006.01)

(52) U.S. Cl.
USPC ............ 360/123.06; 360/123.07; 360/123.08; 360/123.11

(58) Field of Classification Search
USPC .......................... 360/123.06–123.08, 123.11
See application file for complete search history.

(56) References Cited

U.S. PATENT DOCUMENTS

| | | | |
|---|---|---|---|
| 4,639,811 A | 1/1987 | Diepers et al. | |
| 4,652,956 A | 3/1987 | Schewe | |
| 4,694,368 A | 9/1987 | Bischoff et al. | |
| 4,703,382 A | 10/1987 | Schewe et al. | |
| 5,173,826 A | 12/1992 | Bischoff | |
| 5,472,736 A | 12/1995 | Barr et al. | |
| 5,875,080 A | 2/1999 | Seagle | |
| 6,246,541 B1 | 6/2001 | Furuichi et al. | |
| 6,333,830 B2 | 12/2001 | Rose et al. | |
| 6,349,014 B1 | 2/2002 | Crue, Jr. et al. | |
| 6,466,404 B1 | 10/2002 | Crue, Jr. et al. | |
| 6,525,901 B1 | 2/2003 | Kamijima et al. | |
| 6,654,202 B2 * | 11/2003 | Rea et al. | 360/123.2 |
| 6,861,937 B1 | 3/2005 | Feng et al. | |
| 7,006,327 B2 | 2/2006 | Krounbi et al. | |
| 7,116,517 B1 | 10/2006 | He et al. | |
| 7,126,788 B1 | 10/2006 | Liu et al. | |
| 7,386,933 B1 | 6/2008 | Krounbi et al. | |
| 8,035,920 B2 * | 10/2011 | Na et al. | 360/123.03 |
| 8,035,921 B2 | 10/2011 | Sunwoo | |
| 8,218,264 B1 | 7/2012 | Sasaki et al. | |
| 8,300,357 B1 | 10/2012 | Sasaki et al. | |
| 8,422,166 B1 | 4/2013 | Sasaki et al. | |
| 8,514,517 B1 | 8/2013 | Batra et al. | |
| 8,547,659 B1 | 10/2013 | Bai et al. | |
| 2004/0169958 A1 | 9/2004 | Krounbi et al. | |
| 2005/0024765 A1 | 2/2005 | Han et al. | |
| 2005/0052771 A1 * | 3/2005 | Rausch et al. | 360/59 |
| 2008/0316646 A1 * | 12/2008 | Na et al. | 360/123.05 |
| 2011/0273797 A1 | 11/2011 | Biskeborn et al. | |

\* cited by examiner

*Primary Examiner* — Wayne Young
*Assistant Examiner* — Carlos E Garcia

(57) ABSTRACT

A method and system provide a magnetic transducer having an air-bearing surface (ABS). The magnetic transducer includes a write pole and a coil. The write pole has a pole tip and a yoke. The coil energizes the write pole and includes a plurality of turns. A turn of the plurality of turns has a first portion and a second portion. The first portion has a first length in a stripe height direction substantially perpendicular to the ABS. The second portion has a second length in the stripe height direction. The second length is greater than the first length and extends at least to at least one adjacent turn.

18 Claims, 6 Drawing Sheets

MAGNETIC WRITER CONFIGURED FOR HIGH DATA RATE RECORDING

BACKGROUND

Disk drives typically use heads residing on sliders to read from and write to the magnetic media. A head typically includes a read transducer and a write, or recording transducer. FIGS. 1-3 depict various conventional magnetic recording transducers 10, 10', and 10", respectively. The magnetic recording transducers 10, 10', and 10' include coils 12, 12', and 12", main poles 14, 14', and 14", insulators 16, 16', and 16", and shield 18, 18', 18". The conventional write transducer 10 typically utilizes photoresist as the insulator 16. In addition, the return shield 18 is typically formed of two separate pieces-18A and 18B. The conventional write transducer 10' uses a single piece, dome-shaped shield 18'. Photoresist is still used as the insulator 16'. The write transducer 10" has an insulator such as alumina conformally deposited around the turns of the coins 12". A single piece shield 18" may also be used. Further, the coils 12, 12', and 12" each have three turns. Typically, three turns are required to obtain a sufficient field in the yoke of the pole 14.

The trend in magnetic recording is to higher densities and higher data rates. For higher data rates, additional requirements may be placed on the conventional write transducer 10, 10', and 10". For example, a shorter yoke length is generally desired. A shorter yoke length allows for faster reversals in the magnetic flux generated by the pole 14. A shorter yoke length also corresponds to a smaller distance available for the coils 12, 12', and 12". However, the conventional transducers 10, 10', and 10" can only be shrunk to a limited extent because of the coil cross-section required to support the desired current and insulation between the turns. For example, the length of the yoke for the transducers 10, 10', and 10" is typically 5 μm or longer. In addition to a shorter yoke length, reduced pole tip protrusions are also desired. Pole tip protrusion occurs when a portion of the transducer projects outward from the ABS. For the conventional write transducer 10, a permanent pole tip protrusion generally exists due to the two piece shield. For the transducers 10 and 10', thermal protrusion may occur due to the large coefficient of thermal expansion of the photoresist used for the insulators 16 and 16'. Although the pole 10" does not use photoresist and may use a single piece shield, the insulator 16" is not smooth above the turns of the upper coil 12". The shield 18" is conformal with the insulator 16" and thus also exhibits the wiggles sown in FIG. 3. These nonuniformities adversely affect the conduction of flux by the shield 18" at high data rates. This is also undesirable. Thus, the write transducers 10, 10', and 10" may be unsuitable for use at higher data rates.

Accordingly, what is needed is a system and method for providing improved write transducers that may be used at higher data rates.

BRIEF SUMMARY OF THE INVENTION

A method and system provide a magnetic transducer having an air-bearing surface (ABS). The magnetic transducer includes a write pole and a coil. The write pole has a pole tip and a yoke. The coil energizes the write pole and includes a plurality of turns. A turn of the plurality of turns has a first portion and a second portion. The first portion has a first length in a stripe height direction substantially perpendicular to the ABS. The second portion has a second length in the stripe height direction. The second length is greater than the first length and extends at least to at least one adjacent turn of the plurality of turns.

DETAILED DESCRIPTION OF THE PREFERRED EMBODIMENTS

Figure 1:
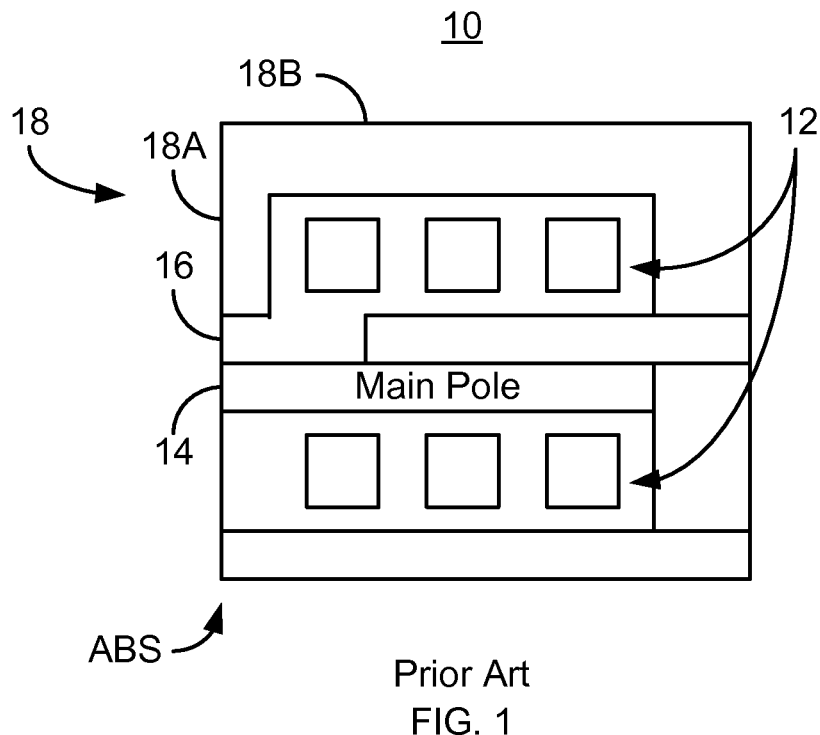
FIG. 1 is a diagram of a side view of a conventional write transducer.
Figure 2:
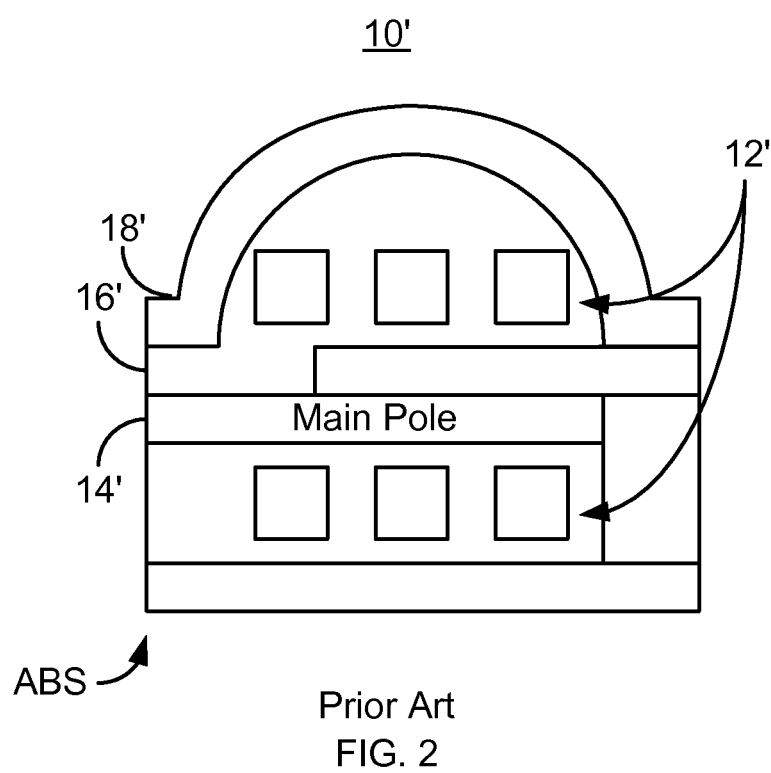
FIG. 2 depicts a side view of a conventional write transducer.
Figure 3:
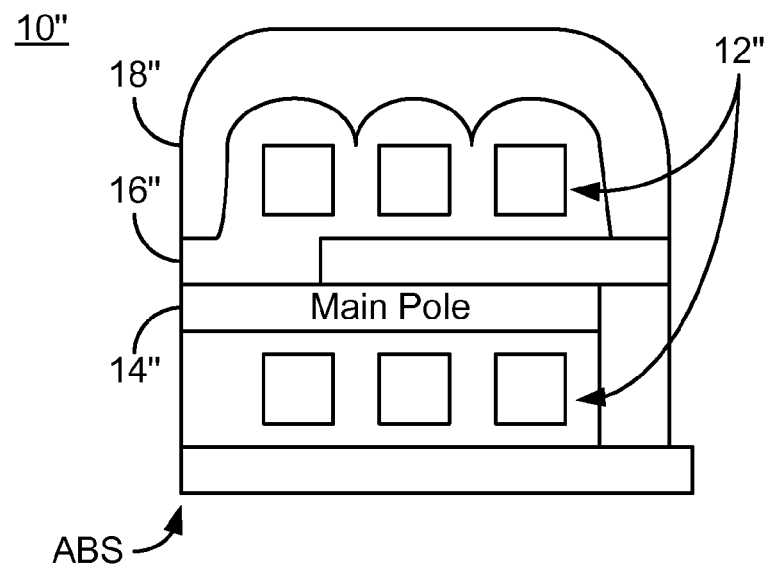
FIG. 3 depicts a side view of a conventional write transducers drive.
Figure 4:
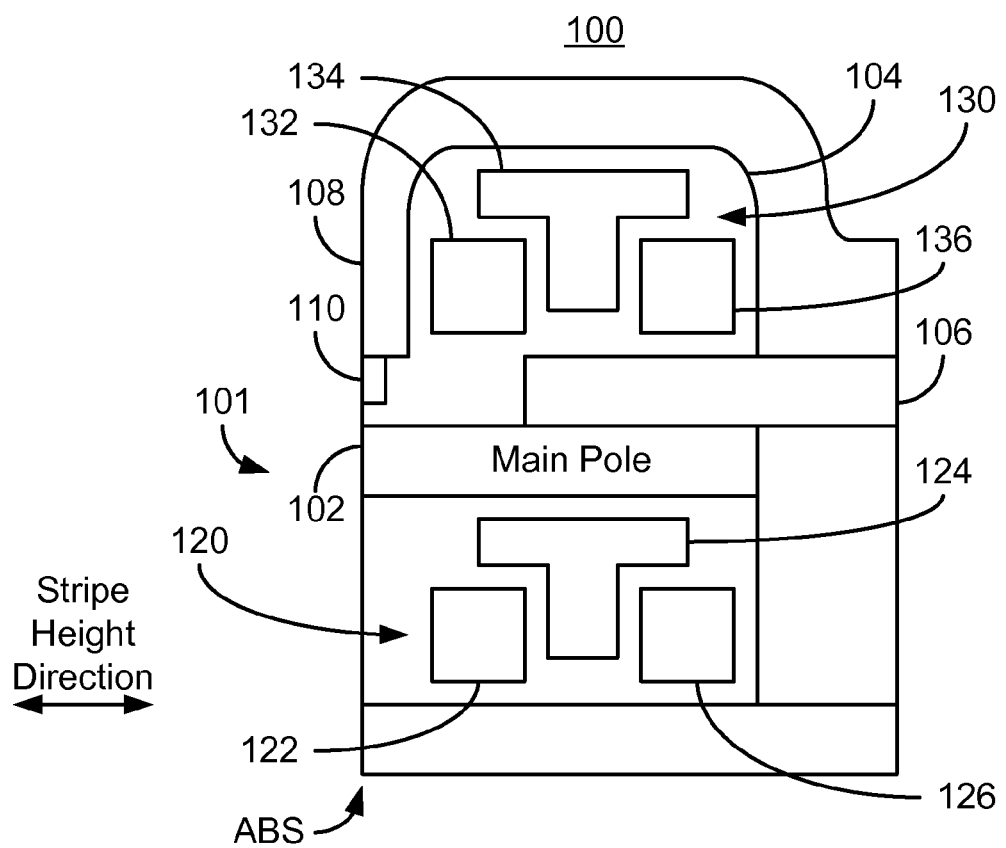
FIG. 4 depicts a side view of an exemplary embodiment of a write transducer.

FIG. 4 depicts a side view of a portion of an exemplary embodiment of a disk drive. More specifically, FIG. 4 depicts a portion of a write transducer 100. The write transducer 100 may be part of a merged head that also includes a read transducer and which resides in a disk drive. For simplicity, components are omitted. In addition, for clarity, FIG. 4 is not drawn to scale.

The magnetic transducer 100 has a write pole 101 as well as coils 120 and 130. The write pole 101 includes main pole 102 and auxiliary pole 106. Also shown are insulator 104, shield 108, and pedestal 110. The pole 101 has a pole tip opposite to the pedestal 110 and a yoke which lies between the coils 120 and 130. The pole 101 may be a perpendicular magnetic recording (PMR) pole. Thus, the transducer 100 may be a PMR transducer. However, the pole 101 and transducer may be used in other writers. For example, the transducer 100 may be an energy assisted magnetic recording (EAMR) transducer. In such a case, optics (not shown) are typically included. Further, a read transducer may also be coupled with the write transducer 100. The shield 108 is a single piece. However, in other embodiments, the shield 108 may have multiple pieces.

The coils 120 and 130 are conductive and carry a write current used to energize the pole. In some embodiments, the coils 120 and 130 may be separate, pancake coils. In other embodiments, the coils 120 and 130 form a single helical coil. In addition, although a single layer of coils 120 and 130 are shown on either side of the pole 101, multiple layers of coils could be provided. The insulator 104 may include several different insulators and/or may be formed in multiple fabrication steps. The insulator 104 is nonmagnetic and insulates the turns 132, 134, and 136 of the coil 130. Another, analogous insulator may be used to insulate the turns 122, 124, and 126 of the coil 120. The insulator 104 may be photoresist. However, in other embodiments, the insulator 104 may include other materials. For example, aluminum oxide may be used for the insulator 104. However, because of the configuration of the coil 130, the dome shape of the insulator 104 may be maintained even if aluminum oxide is used.

The coil 120 includes turns 122, 124, and 126. Similarly, the coil 130 includes turns 132, 134, and 136. In another embodiment, the coil 130 and/or 120 may have only two turns. In such an embodiment, either the turns 122/132 and 124/134 or the turns 124/134 and 126/136 would be included. Thus, the turn 124/134 would be present in either embodiment. One of the turns 124 and 134 for each coil 120 and 130, respectively, has a first portion and a second portion. The first portion has a first length in the stripe height direction. As can be seen in FIG. 4, the stripe height direction is substantially perpendicular to the ABS. The first portion of the turn 124 and 134 is the lower portion in FIG. 4. The second portion of the coils 124 and 134 has a second length in the stripe height direction that is greater than the first length. This second portion is the top of the "T" of coils 124 and 134 in FIG. 4. This portion is longer than the first portion and extends at least to at least one adjacent turn 122 or 126, or 132 and 136. In the embodiment shown, the top of the "T" extends approximately half-way across the adjacent turns 122, 126, 132, and 136. However, in other embodiments, the portion of the coil 124/134 that is longer in the stripe height direction may extend a different amount. Further, a "T" shape need not be used. Other shapes that may be used include but are not limited to an inverted-T, an L, an inverted-L, an "I" and a trapezoid. Further, other shapes might be used. The turns 124 and 134 depicted are symmetric. In other embodiments, the turn 124 and/or 134 may not be symmetric. For example, the horizontal portion of the "T" need not be centered over the vertical portion. In addition, the edges of the turns 124 and 134 are shown as straight. Thus, the first and second portions of the turn 124 and 134 have rectangular cross sections. However, in other embodiments, the sides of the turn 124 and/or 134 need not be straight. For example, the sides may be curved. For an I-shaped turn, there may be two portions that are longer and extend to a neighboring turn. In general, the longer, second portion of the coil 124 or 134 is desired to be above or below the plane of the remaining turns 122, 126, 132, and 136 as this portion of the coil 124 or 134 extends over neighboring turn(s). Also in the embodiment shown, both coils 120 and 130 have a turn 124 and 134, respectively, which extends over a neighboring turn. However, in other embodiments, only one of the coils 120 or 130 might have such a turn. Further, if multiple layers of coils are provided, one or more of the layers may include such a turn 124 or 134.

As can be seen in FIG. 4, the thinner portion of the turns 124 and 134 (e.g. the vertical portion of the T) is thinner than the remaining turns 122 and 126 and 134 and 136, respectively. In addition the insulation between the turns 122, 124, and 126 and between the turns 132, 134, and 136 may be thin. For example, for some insulators, the distance between the turns 122, 124, and 126 and/or 132, 134 and 136 may be as low as 0.1 micron. As a result, the length of the coils 120 and 130 in the stripe height direction may be reduced while the current carrying ability of the coils 120 and 130 may be maintained. For example, in some embodiments, the coil 120 and/or 130 extend not more than 4.5 µm in the stripe height direction. Thus, the yoke of the pole 101 may be not more than 4.5 µm. In some embodiments, the yoke length is not more than 3.5 µm.

The magnetic transducer 100 may have improved performance at high data rates. Because of the configuration of the turns 124 and 134, the coils 120 and 130 may occupy less space in the stripe height direction. As a result, the yoke may be shorter. The response time of the pole 101 may thus be improved. In addition, the insulator 104 may be an insulator such as aluminum oxide while maintaining the smooth dome shape that tracks the top of the coil 130. Because a low coefficient of thermal expansion insulator such as aluminum oxide may be used while maintaining the smooth profile of the shield 108, the write transducer 100 may be less subject to thermal protrusions. Further, the shield 108 may be formed from a single piece. Thus, protrusions may be further limited. In addition, the bottom surface of the turns 124 and 134 is slightly higher than the bottom surfaces of the turns 122 and 126 and the turns 132 and 136, respectively. Consequently, the coils 120/130 may be formed by providing the turns 122/132 and 126/136, depositing an insulating layer, then providing the remaining turn 124/134. Thus, fabrication of the coils 120 and 130 may be relatively simple. Note, however, that in other embodiments, other methods may be used and other relationships between the bottoms of the turns 122, 124, and 126 and the turns 132, 134, and 136 may be possible.

Figure 5:
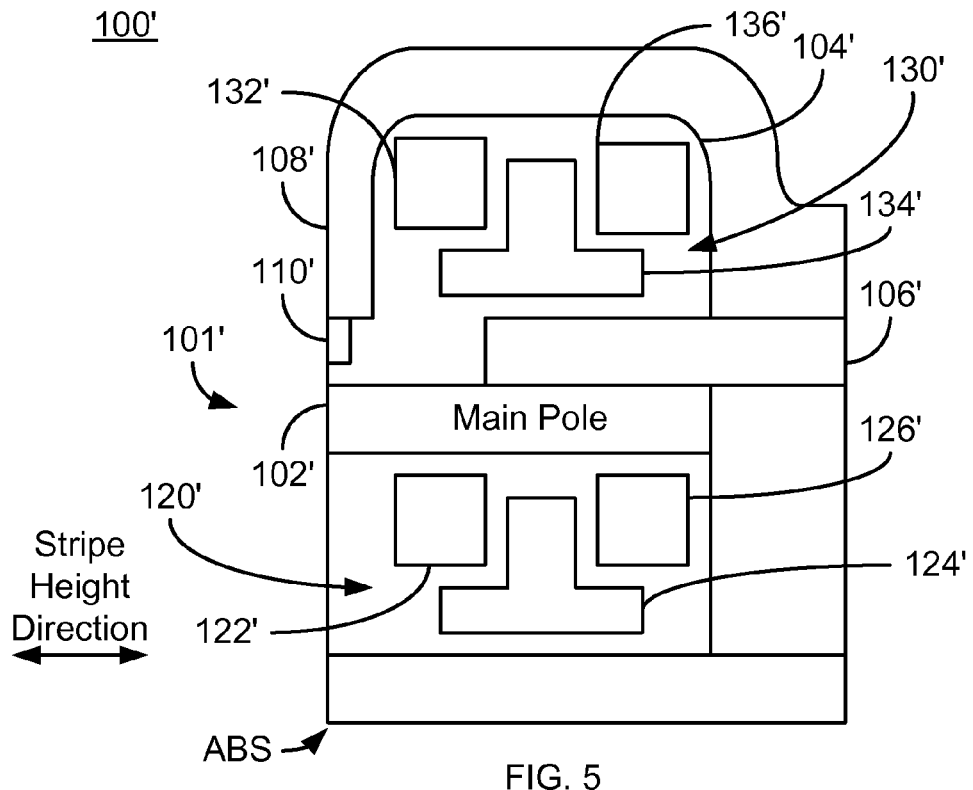
FIG. 5 depicts a side view of another exemplary embodiment of a write transducer.

FIG. 5 depicts a side view of an exemplary embodiment of a magnetic recording transducer 100'. For simplicity, FIG. 5 is not to scale. The magnetic transducer 100' is analogous to the magnetic transducer 100. Consequently, analogous components are labeled similarly. The magnetic write transducer 100' thus includes a write pole 101' having a main pole 102' and auxiliary pole 106', insulator 104', shield 108', pedestal 110', and coils 120' and 130' that are analogous to the write pole 101 having the main pole 102 and auxiliary pole 106, the insulator 104, the shield 108, the pedestal 110, and the coils 120 and 130, respectively.

The coils 120' and 130' are conductive and carry a write current used to energize the pole. In some embodiments, the coils 120' and 130' may be separate, pancake coils. In other embodiments, the coils 120' and 130' form a single helical coil. In addition, although a single layer of coils 120' and 130' are shown on either side of the pole 101', multiple layers of coils could be provided. The insulator 104' may include several different insulators and/or may be formed in multiple fabrication steps. The insulator 104' is nonmagnetic and insulates the turns 132', 134', and 136' of the coil 130'. The insulator 104" may be photoresist. However, in other embodiments, the insulator 104' may include other materials. For example, aluminum oxide may be used for the insulator 104'. However, because of the configuration of the coil 130', the dome shape of the insulator 104' may be maintained. Another, analogous insulator may be used to insulate the turns of the coil 120'.

The coils 120' and 130' are analogous to the coils 120 and 130, respectively. The coil 120' includes turns 122', 124', and 126' analogous to the turns 122, 124, and 126, respectively. Similarly, the coil 130' includes turns 132', 134', and 136'. Thus, the turns 122', 124', 126', 132', 134', and 136' may have an analogous configuration and operation to the turns 122, 124, 126, 132, 134, and 136, respectively. For example, the number of turns, the material(s) used, and other aspects of the coils 120' and/or 130' may be varied as described above. However, in the embodiment shown, the coils 124' and 134' are inverted "T"'s. More specifically, the longer portion that in the stripe height direction is at the bottom of the turns 134' and 136'.

The magnetic transducer 100' may share the benefits of the magnetic transducer 100. The magnetic transducer 100' may have improved performance at high data rates. Because of the configuration of the turns 124' and 134', the coils 120' and 130' may occupy less space in the stripe height direction. As a result, the yoke may be shorter. The response time of the pole 101' may thus be improved. In addition, the insulator 104' may be an insulator such as aluminum oxide while maintaining the smooth dome shape that tracks the top of the coil 130'. Because a low coefficient of thermal expansion insulator such as aluminum oxide may be used, the write transducer 100' may be less subject to thermal protrusions. Further, the shield 108' may be formed from a single piece. Thus, protrusions may be further limited. In addition, the bottom surface of the turns 124' and 134' is slightly higher than the bottom surfaces of the turns 122' and 126' and the turns 132' and 136', respectively. Consequently, the coils 120'/130' may be formed by providing the turns 122'/132' and 126'/136', depositing an insulating layer, then providing the remaining turn 124'/134'. Thus, fabrication of the coils 120' and 130' may be relatively simple. However, in other embodiments, other methods may be used and other relationships between the bottoms of the turns 122', 124', and 126' and the turns 132', 134', and 136' may be possible.

Figure 6:
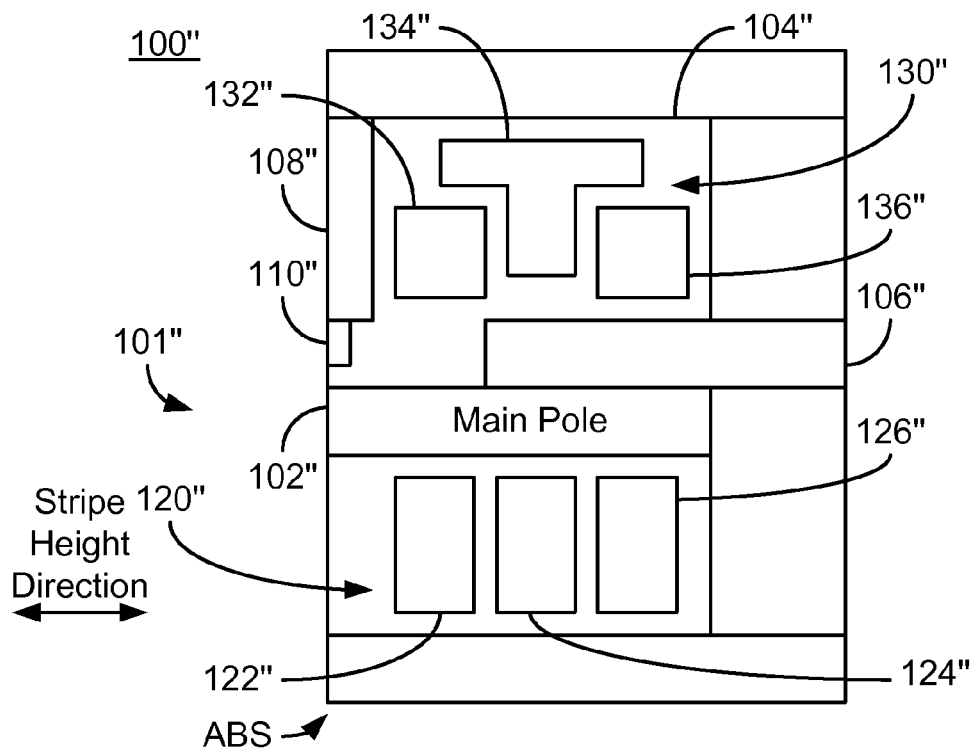
FIG. 6 depicts a side view of another exemplary embodiment of a write transducer

FIG. 6 depicts a side view of an exemplary embodiment of a magnetic recording transducer 100". For simplicity, FIG. 6 is not to scale. The magnetic transducer 100" is analogous to the magnetic transducers 100 and 100'. Consequently, analogous components are labeled similarly. The magnetic write transducer 100" thus includes a write pole 101" having a main pole 102" and auxiliary pole 106", insulator 104", shield 108", pedestal 110", and coils 120" and 130" that are analogous to the write pole 101/101' having the main pole 102/102' and auxiliary pole 106/106', the insulator 104/104', the shield 108/108', the pedestal 110/110', and the coils 120/210' and 130/130', respectively.

The coils 120" and 130" are conductive and carry a write current used to energize the pole. In some embodiments, the coils 120" and 130" may be separate, pancake coils. In other embodiments, the coils 120" and 130" form a single helical coil. In addition, although a single layer of coils 120" and 130" are shown on either side of the pole 101", multiple layers of coils could be provided. The insulator 104" may include several different insulators and/or may be formed in multiple fabrication steps. The insulator 104" is nonmagnetic and insulates the turns 132", 134", and 136" of the coil 130". The insulator 104" may be aluminum oxide. However, in other embodiments, the insulator 104" may include other materials including but not limited to photoresist.

The coils 120" and 130" are analogous to the coils 120/120' and 130/130', respectively. The coil 120" includes turns 122", 124", and 126" analogous to the turns 122/122', 124/124', and 126/126', respectively. Similarly, the coil 130" includes turns 132", 134", and 136". Thus, the turns 122", 124", 126", 132", 134", and 136" may have an analogous configuration and operation to the turns 122/122', 124/124', 126/126', 132/132', 134/134', and 136/136', respectively. For example, the number of turns, the material(s) used, and other aspects of the coils 120" and/or 130" may be varied as described above. However, in the embodiment shown, the turn 124" is the same as the remaining turns 122" and 124". Thus, only the top coil 130" has a T-shaped coil. In addition, in the embodiment shown, the shield 108" includes multiple parts. Further, the shield 108" does not have a dome shape. However, in another embodiment, the shield 108" would be a single piece and dome shaped.

The magnetic transducer 100" may share the benefits of the magnetic transducers 100 and 100'. The magnetic transducer 100" may have improved performance at high data rates. Because of the configuration of the turns 134", the coil 130" may occupy less space in the stripe height direction. As a result, the yoke may be shorter. The response time of the pole 101" may thus be improved. In addition, the insulator 104" may be an insulator such as aluminum oxide. Because a low coefficient of thermal expansion insulator such as aluminum oxide may be used, the write transducer 100" may be less subject to thermal protrusions. Further, in other embodiments, the shield 108" may be formed from a single piece and/or be dome shaped. Thus, protrusions may be further limited. In addition, the bottom surface of the turn 134" is slightly higher than the bottom surfaces of the turns 132" and 136", respectively. Consequently, fabrication of the coil 130" may be simplified. However, in other embodiments, other methods may be used and other relationships between the bottoms of the turns 132", 134", and 136" may be possible.

Figure 7:
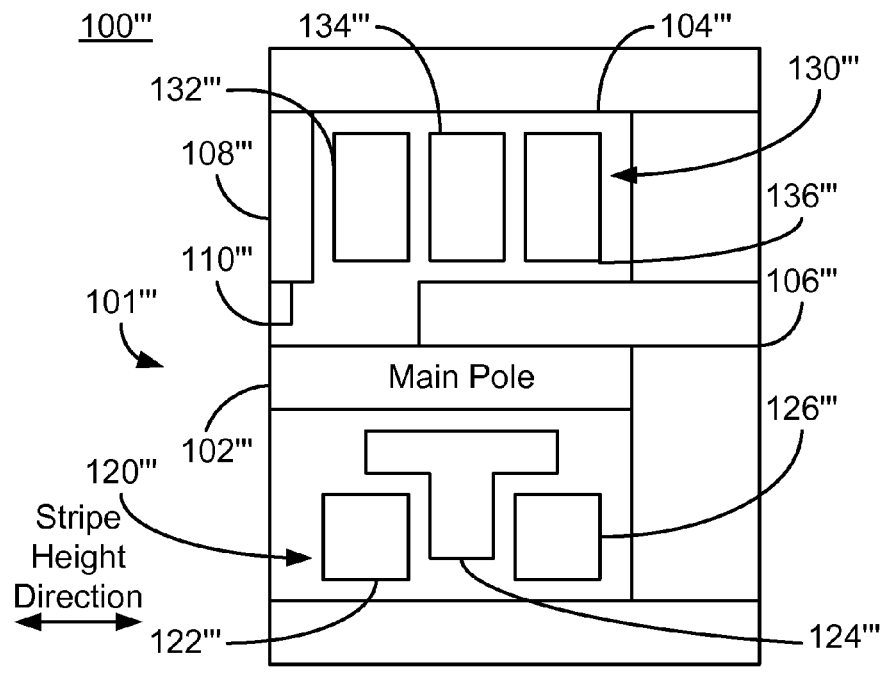
FIG. 7 depicts a side view of another exemplary embodiment of a write transducer

FIG. 7 depicts a side view of an exemplary embodiment of a magnetic recording transducer 100'''. For simplicity, FIG. 7 is not to scale. The magnetic transducer 100''' is analogous to the magnetic transducers 100, 100', and 100". Consequently, analogous components are labeled similarly. The magnetic write transducer 100''' thus includes a write pole 101''' having a main pole 102''' and auxiliary pole 106''', insulator 104''', shield 108''', pedestal 110''', and coils 120''' and 130''' that are analogous to the write pole 101/101'/101" having the main pole 102/102'/102" and auxiliary pole 106/106'/106", the insulator 104/104'/104", the shield 108/108'/108", the pedestal 110/110'/110", and the coils 120/120'/120" and 130/130'/130", respectively.

The coils 120''' and 130''' are conductive and carry a write current used to energize the pole. In some embodiments, the coils 120''' and 130''' may be separate, pancake coils. In other embodiments, the coils 120''' and 130''' form a single helical coil. In addition, although a single layer of coils 120''' and 130''' are shown on either side of the pole 101''', multiple layers of coils could be provided. The insulator 104''' may include several different insulators and/or may be formed in multiple fabrication steps. The insulator 104''' is nonmagnetic and insulates the turns 132''', 134''', and 136''' of the coil 130'''. The insulator 104''' may be aluminum oxide. However, in other embodiments, the insulator 104''' may include other materials including but not limited to photoresist.

The coils 120''' and 130''' are analogous to the coils 120/120'/120" and 130/130'/130', respectively. The coil 120''' includes turns 122''', 124''', and 126''' analogous to the turns 122/122'/122", 124/124'/124", and 126/126'/126", respectively. Similarly, the coil 130''' includes turns 132''', 134''', and 136''' analogous to the turns 132/132'/132", 134/134'/134", and 136/136'/136". Thus, the turns 122''', 124''', 126''', 132''', 134''', and 136''' may have an analogous configuration and operation to the turns 122/122'/122", 124/124'/124", 126/126'/126", 132/132'/132", 134/134'/134", and 136/136'/136", respectively. For example, the number of turns, the material (s) used, and other aspects of the coils 120''' and/or 130''' may be varied as described above. However, in the embodiment shown, the turn 134''' is the same as the remaining turns 132''' and 134'''. Thus, only the bottom coil 120''' has a T-shaped coil. In addition, in the embodiment shown, the shield 108''' includes multiple parts. Further, the shield 108" does not have a dome shape. However, in another embodiment, the shield 108" would be a single piece and dome shaped.

The magnetic transducer 100''' may share the benefits of the magnetic transducers 100, 100' and 100". The magnetic transducer 100" may have improved performance at high data rates. Because of the configuration of the turns 124''', the coil 120''' may occupy less space in the stripe height direction. As a result, the yoke may be shorter. The response time of the pole 101''' may thus be improved. In addition, the insulator 104''' may be an insulator such as aluminum oxide. Because a low coefficient of thermal expansion insulator oxide may be used, the write transducer 100''' may be less subject to thermal protrusions. Further, in other embodiments, the shield 108''' may be formed from a single piece and/or be dome shaped. Thus, protrusions may be further limited. In addition, the bottom surface of the turn 124''' is slightly higher than the bottom surfaces of the turns 132''' and 136''', respectively. Consequently, fabrication of the coil 120''' may be simplified. However, in other embodiments, other methods may be used and other relationships between the bottoms of the turns 122''', 124''', and 126''' may be possible.

Figure 8:
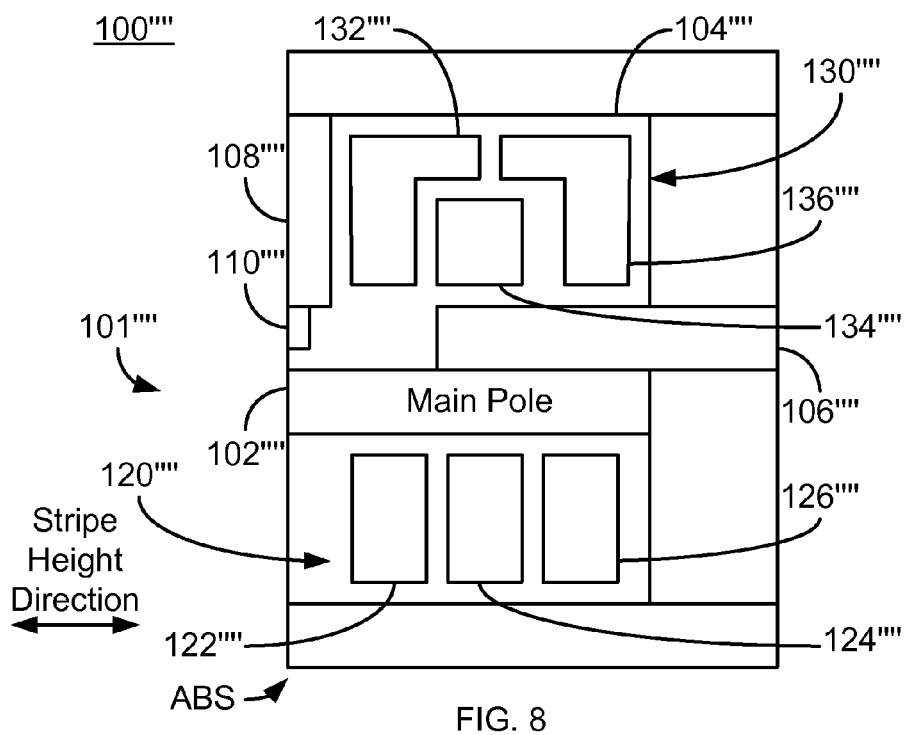
FIG. 8 depicts a side view of another exemplary embodiment of a write transducer

FIG. 8 depicts a side view of an exemplary embodiment of a magnetic recording transducer 100''''. For simplicity, FIG. 8 is not to scale. The magnetic transducer 100'''' is analogous to the magnetic transducers 100, 100', 100'', and 100'''. Consequently, analogous components are labeled similarly. The magnetic write transducer 100'''' thus includes a write pole 101'''' having a main pole 102'''' and auxiliary pole 106'''', insulator 104'''', shield 108'''', pedestal 110'''', and coils 120'''' and 130'''' that are analogous to the write pole 101/101'/101''/101''' having the main pole 102/102'/102''/102''' and auxiliary pole 106/106'/106''/106''', the insulator 104/104'/104''/104''', the shield 108/108'/108''/108''', the pedestal 110/110'/110''/110''', and the coils 120/120'/120''/120''' and 130/130'/130''/130''', respectively.

The coils 120'''' and 130'''' are conductive and carry a write current used to energize the pole. In some embodiments, the coils 120'''' and 130'''' may be separate, pancake coils. In other embodiments, the coils 120'''' and 130'''' form a single helical coil. In addition, although a single layer of coils 120'''' and 130'''' are shown on either side of the pole 101'''', multiple layers of coils could be provided. The insulator 104'''' may include several different insulators and/or may be formed in multiple fabrication steps. The insulator 104'''' is nonmagnetic and insulates the turns 132'''', 134'''', and 136'''' of the coil 130''''. The insulator 104'''' may be aluminum oxide. However, in other embodiments, the insulator 104'''' may include other materials including but not limited to photoresist.

The coils 120'''' and 130'''' are analogous to the coils 120/120'/120''/120''' and 130/130'/130''/130''', respectively. The coil 120'''' includes turns 122'''', 124'''', and 126'''' analogous to the turns 122/122'/122''/122''', 124/124'/124''/124''', and 126/126'/126''/126''', respectively. Similarly, the coil 130'''' includes turns 132'''', 134'''', and 136'''' analogous to the turns 132/132'/132''/132''', 134/134'/134''/134''', and 136/136'/136''/136'''. Thus, the turns 122'''', 124'''', 126'''', 132'''', 134'''', and 136'''' may have an analogous configuration and operation to the turns 122/122'/122''/122''', 124/124'/124''/124''', 126/126'/126''/126''', 132/132'/132''/132''', 134/134'/134''/134''', and 136/136'/136''/136''', respectively. For example, the number of turns, the material(s) used, and other aspects of the coils 120'''' and/or 130'''' may be varied as described above. However, in the embodiment shown, the turns 132'''' and 134''' includes portions that are longer in the stripe height direction. More specifically, the turns 132'''' and 136'''' are inverted L-shapes. In other embodiments, the bottom coil 120'''' may include inverted "L" shapes. Further, the coil 130'''' and/or the coil 120'''' may be "L" shaped (instead of inverted "L"-shaped). In addition, in the embodiment shown, the shield 108'''' includes multiple parts. Further, the shield 108''' does not have a dome shape. However, in another embodiment, the shield 108''' would be a single piece and/or may be dome shaped.

The magnetic transducer 100'''' may share the benefits of the magnetic transducers 100, 100', 100'', and 100'''. The magnetic transducer 100'''' may have improved performance at high data rates. Because of the configuration of the turns 132'''' and 136'''', the coil 130'''' may occupy less space in the stripe height direction. As a result, the yoke may be shorter. The response time of the pole 101'''' may thus be improved. In addition, the insulator 104'''' may be an insulator such as aluminum oxide. Because a low coefficient of thermal expansion insulator oxide may be used, the write transducer 100'''' may be less subject to thermal protrusions. Further, in other embodiments, the shield 108'''' may be formed from a single piece and/or be dome shaped. Thus, protrusions may be further limited. In addition, the bottom surfaces of the turns 132'''' and 136'''' are slightly higher than the bottom surface of the turn 134''''. Consequently, fabrication of the coil 130'''' may be simplified. However, in other embodiments, other methods may be used and other relationships between the bottoms of the turns 132'''', 134'''', and 136'''' may be possible.

Figure 9:
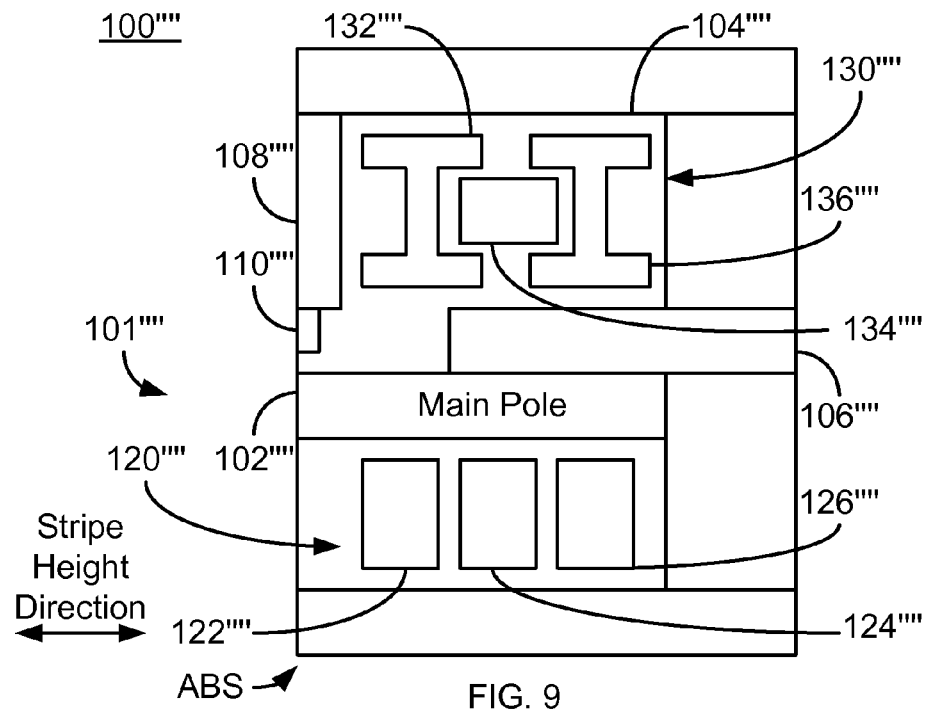
FIG. 9 depicts a side view of another exemplary embodiment of a write transducer

FIG. 9 depicts a side view of an exemplary embodiment of a magnetic recording transducer 100'''''. For simplicity, FIG. 9 is not to scale. The magnetic transducer 100''''' is analogous to the magnetic transducers 100, 100', 100'', 100''', and 100''''. Consequently, analogous components are labeled similarly. The magnetic write transducer 100''''' thus includes a write pole 101''''' having a main pole 102''''' and auxiliary pole 106''''', insulator 104''''', shield 108''''', pedestal 110''''', and coils 120''''' and 130''''' that are analogous to the write pole 101/101'/101''/101'''/101'''' having the main pole 102/102'/102''/102'''/102'''' and auxiliary pole 106/106'/106''/106'''/106'''', the insulator 104/104'/104''/104'''/104'''', the shield 108/108'/108''/108'''/108'''', the pedestal 110/110'/110''/110'''/110'''', and the coils 120/120'/120''/120'''/120'''' and 130/130'/130''/130'''/130'''', respectively.

The coils 120''''' and 130''''' are conductive and carry a write current used to energize the pole. In some embodiments, the coils 120''''' and 130''''' may be separate, pancake coils. In other embodiments, the coils 120''''' and 130''''' form a single helical coil. In addition, although a single layer of coils 120''''' and 130''''' are shown on either side of the pole 101''''', multiple layers of coils could be provided. The insulator 104''''' may include several different insulators and/or may be formed in multiple fabrication steps. The insulator 104''''' is nonmagnetic and insulates the turns 132''''', 134''''', and 136''''' of the coil 130'''''. The insulator 104''''' may be aluminum oxide. However, in other embodiments, the insulator 104''''' may include other materials including but not limited to photoresist.

The coils 120''''' and 130''''' are analogous to the coils 120/120'/120''/120'''/120'''' and 130/130'/130''/130'''/130'''', respectively. The coil 120''''' includes turns 122''''', 124''''', and 126''''' analogous to the turns 122/122'/122''/122'''/122'''', 124/124'/124''/124'''/124'''', and 126/126'/126''/126'''/126'''', respectively. Similarly, the coil 130''''' includes turns 132''''', 134''''', and 136''''' analogous to the turns 132/132'/132''/132'''/132'''', 134/134'/134''/134'''/134'''', and 136/136'/136''/136'''/136''''. Thus, the turns 122''''', 124''''', 126''''', 132''''', 134''''', and 136''''' may have an analogous configuration and operation to the turns 122/122'/122''/122'''/122''''/, 124/124'/124''/124'''/124'''', 126/126'/126''/126'''/126'''', 132/132'/132''/132'''/132'''', 134/134'/134''/134'''/134'''', and 136/136'/136''/136'''/136'''', respectively. For example, the number of turns, the material(s) used, and other aspects of the coils 120''''' and/or 130''''' may be varied as described above. However, in the embodiment shown, the turns 132''''' and 134''''' includes portions that are longer in the stripe height direction. More specifically, the turns 132''''' and 136''''' are I-shapes. In other embodiments, the bottom coil 120''''' may include "I" shapes. In addition, in the embodiment shown, the shield 108''''' includes multiple parts. Further, the shield 108'''' does not have a dome shape. However, in another embodiment, the shield 108'''' would be a single piece and/or may be dome shaped.

The magnetic transducer 100'''' may share the benefits of the magnetic transducers 100, 100', 100'', 100''', 100'''', and 100'''''. The magnetic transducer 100'''' may have improved performance at high data rates. Because of the configuration of the turns 132'''' and 136'''', the coil 130'''' may occupy less space in the stripe height direction. As a result, the yoke may be shorter. The response time of the pole 101'''' may thus be improved. In addition, the insulator 104'''' may be an insulator such as aluminum oxide. Because a low coefficient of thermal expansion insulator oxide may be used, the write transducer 100'''' may be less subject to thermal protrusions. Further, in other embodiments, the shield 108'''' may be formed from a single piece and/or be dome shaped. Thus, protrusions may be further limited. In addition, the bottom surfaces of the turns 132'''' and 136'''' are slightly higher than the bottom surface of the turn 134''''. Consequently, fabrication of the coil 130'''' may be simplified. However, in other embodiments, other methods may be used and other relationships between the bottoms of the turns 132'''', 134'''', and 136'''' may be possible.

Figure 10:
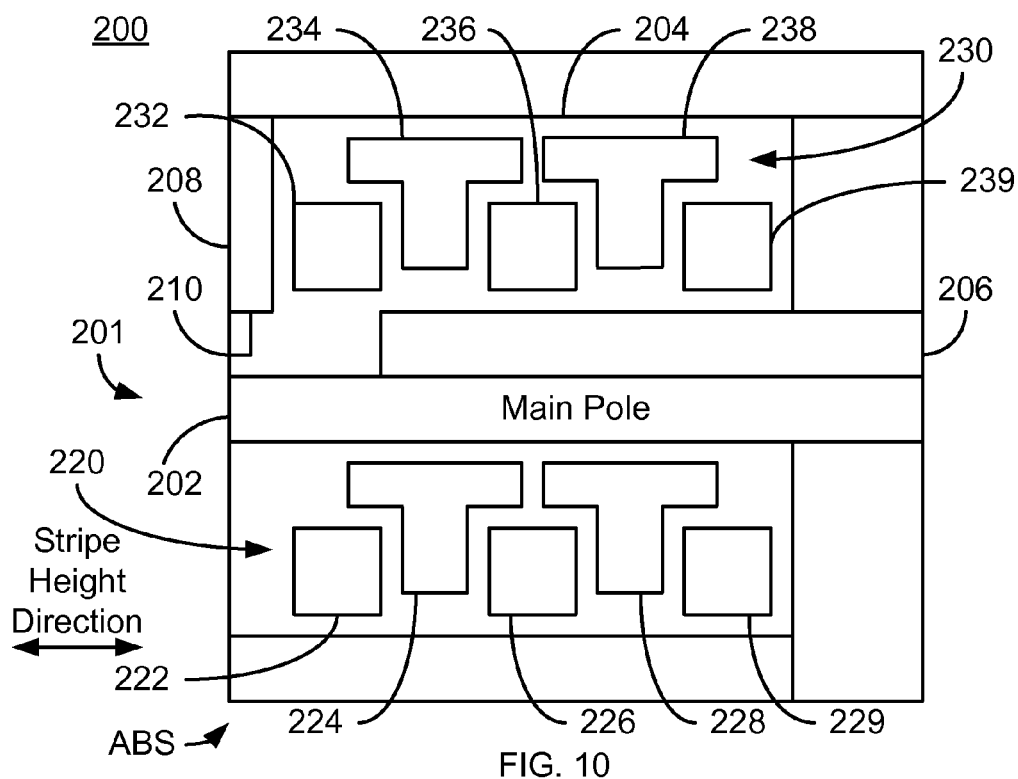
FIG. 10 depicts a side view of another exemplary embodiment of a write transducer
Figure 11:
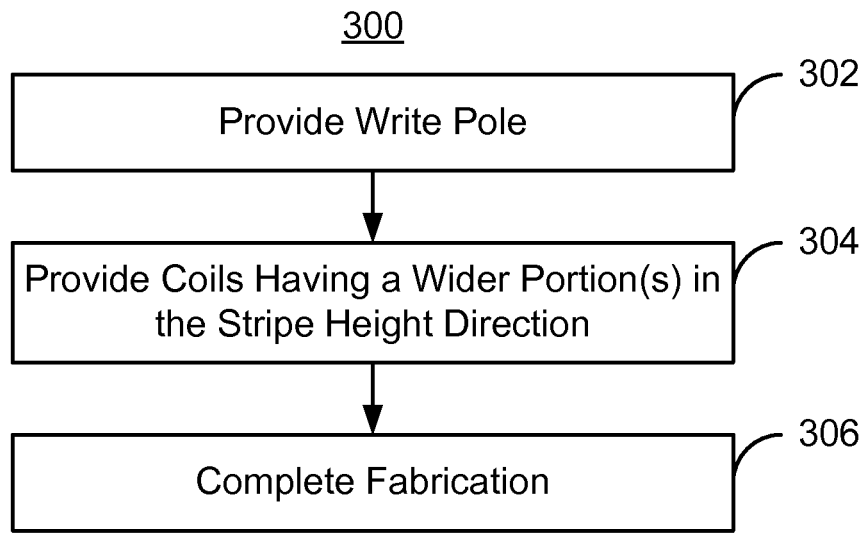
FIG. 11 is a flow chart depicting an exemplary embodiment of a method for providing a write transducer.

FIG. 10 depicts a side view of an exemplary embodiment of a magnetic recording transducer 200. For simplicity, FIG. 10 is not to scale. The magnetic transducer 200 is analogous to the magnetic transducers 100, 100', 100'', 100''', 100'''', and 100'''''. Consequently, analogous components are labeled similarly. The magnetic write transducer 200 thus includes a write pole 201 having a main pole 202 and auxiliary pole 206, insulator 204, shield 208, pedestal 210, and coils 220 and 230 that are analogous to the write pole 101/101'/101''/101'''/101''''/101''''' having the main pole 102/102'/102''/102'''/102''''/102''''' and auxiliary pole 106/106'/106''/106'''/106''''/106''''', the insulator 104/104'/104''/104'''/104''''/104''''', the shield 108/108'/108''/108'''/108''''/108''''', the pedestal 110/110'/110''/110'''/110''''/110''''', and the coils 120/120'/120''/120'''/120''''/120''''' and 130/130'/130''/130'''/130''''/130''''', respectively.

The coils 220 and 230 are conductive and carry a write current used to energize the pole. In some embodiments, the coils 220 and 230 may be separate, pancake coils. In other embodiments, the coils 220 and 230 form a single helical coil. In addition, although a single layer of coils 220 and 230 are shown on either side of the pole 201, multiple layers of coils could be provided. The insulator 204 may include several different insulators and/or may be formed in multiple fabrication steps. The insulator 204 is nonmagnetic and insulates the turns 232, 234, 236, and 238 of the coil 230. The insulator 204 may be aluminum oxide. However, in other embodiments, the insulator 104'''' 204 may include other materials including but not limited to photoresist.

The coils 220 and 230 are analogous to the coils 120/120'/120''/120'''/120''''/120''''' and 130/130'/130''/130'''/130''''/130''''', respectively. The coil 220 includes turns 222, 224, and 226 analogous to the turns 122/122'/122''/122'''/122''''/122''''', 124/124'/124''/124'''/124''''/124''''', and 126/126'/126''/126'''/126''''/126''''', respectively. Similarly, the coil 230 includes turns 232, 234, and 236 analogous to the turns 132/132'/132''/132'''/132''''/132''''', 134/134'/134''/134'''/134''''/134''''', and 136/136'/136''/136'''/136''''/136''''', respectively. Thus, the turns 222, 224, 226, 232, 234, and 236 may have an analogous configuration and operation to the turns of the coils 120/120'/120''/120'''/120''''/120''''' and 130/130'/130''/130'''/130''''/130'''''. For example, the number of turns, the material(s) used, and other aspects of the coils 220 and/or 230 may be varied as described above. However, in the embodiment shown, the coils 20 and 230 include additional turns 228 and 229 and additional turns 238 and 239, respectively. Of these, the turns 228 and 238 each includes portions that are longer in the stripe height direction. Thus, conventional turns 222/232, 226/236, and 229/239 are interleaved with turns 224/234 and 228/238 that have section that overlap adjoining turns. In addition, in the embodiment shown, the shield 208 includes multiple parts. Further, the shield 208 does not have a dome shape. However, in another embodiment, the shield 208 would be a single piece and/or may be dome shaped.

The magnetic transducer 200 may share the benefits of the magnetic transducers 100, 100', 100'', 100''', 100'''', and 100'''''. The magnetic transducer 200 may have improved performance at high data rates. Because of the configuration of the turns 224, 228, 234, and 238, the coils 220 and 230 may occupy less space in the stripe height direction. As a result, the yoke may be shorter. The response time of the pole 201 may thus be improved. In addition, the insulator 204 may be an insulator such as aluminum oxide. Because a low coefficient of thermal expansion insulator oxide may be used, the write transducer 200 may be less subject to thermal protrusions. Further, in other embodiments, the shield 208 may be formed from a single piece and/or be dome shaped. Thus, protrusions may be further limited. In addition, the bottom surfaces of the turns 224, 228, 234, and 238 are slightly higher than the bottom surface of the turns 222, 226, 229, 232, 236, and 239. Consequently, fabrication of the coils 220 and 230 may be simplified. However, in other embodiments, other methods may be used and other relationships between the bottoms of the turns 222, 224, 226, 228, 229, 232, 234, 236, 238, and 239 may be possible. Further, the features of the magnetic transducer 100, 100', 100'', 100''', 100'''', 100''''', and/or 200 may be combined to achieve the desired transducer having improved high data rate recording.

Figure 12:
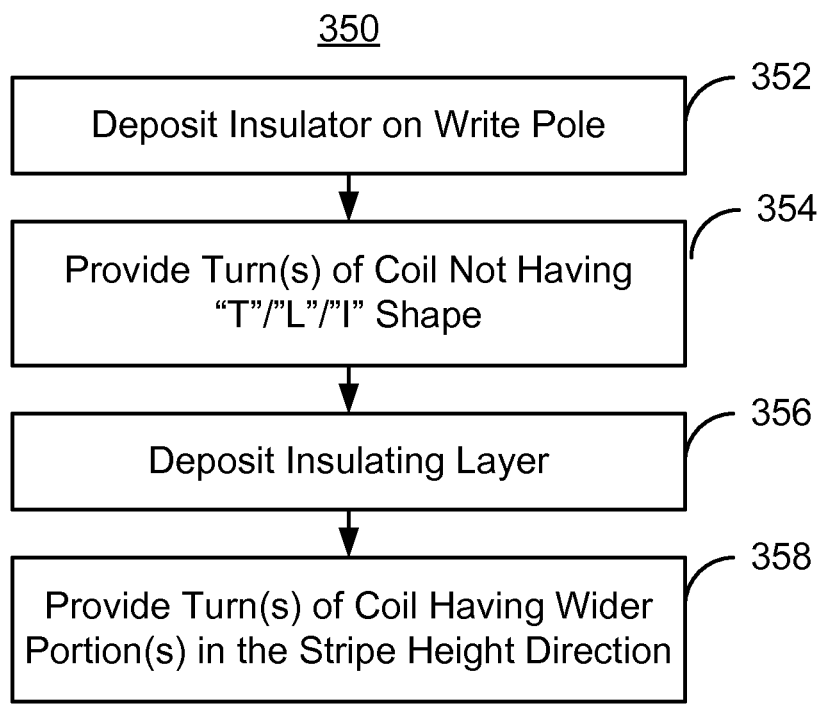
FIG. 12 is a flow chart depicting an exemplary embodiment of a method for providing a write coil in a write transducer.

FIG. 12 depicts an exemplary embodiment of a method 300 for fabricating a magnetic transducer analogous to the transducers 100, 100', 100'', 100''', 100'''', 100''''', and/or 200. The method 300 is described in connection with the transducer 100. However, the method 300 may be used to fabricate any of the transducers 100, 100', 100'', 100''', 100'''', 100''''', and/or 200 as well as other analogous transducers. Although depicted as a flow of single steps, the steps of the method 300 may be performed in parallel. The steps of the method 300 may include substeps and/or may be interleaved.

The write pole 101 is provided, via step 302. The coils 120 and/or 130 are also fabricated, via step 304. Step 304 may include various patterning and deposition steps to form the coils 120 and 130. Further, the steps 302 and 304 are typically interleaved. For example, the coil 120 is provided before the main pole 202 and auxiliary pole 204. In contrast, the coil 130 is provided after the main pole, but before lapping of the transducer 100. Fabrication of the magnetic transducer may then be completed, via step 306. For example, the shield 108 may be formed. In addition, other structure(s) may be formed and the transducer 100 may be lapped to the ABS. Thus, the magnetic recording transducer 100 may be formed. Similarly, the transducers 100', 100'', 100''', 100'''', 100''''', and 200 may be formed. Thus, the benefits of one or more of the transducer 100', 100'', 100''', 100'''', 100''''', and/or 200 may be attained.

FIG. 12 depicts an exemplary embodiment of a method 350 for the turns of a coil 120,120', 120'', 120''', 120'''', 120''''', 220', 130,130', 120'', 130''', 130'''', 130''''', and/or 230'. The method 350 is described in connection with the transducer 100 and coil 130. However, the method 350 may be used for other transducers 100', 100'', 100''', 100'''', 100''''', and/or 200, and other coils 120,120', 120'', 120''', 120'''', 120''''', 220', 130,130', 120", 130''', 130'''', 130''''', and/or 230'. However, the structures formed before or after those described may differ. Further, although depicted as a flow of single steps, the steps of the method 350 may be performed in parallel. The steps of the method 350 may also include substeps, be combined, be performed in parallel and/or be interleaved.

An insulating layer is deposited on the pole 102/104, via step 352. Step 352 may include depositing one or more layers. The insulating layer deposited in step 352 is part of the insulator 104. The coils that do not have an extended portion in the stripe height direction are provided, via step 354. Thus, for the coil 130, this means depositing coils 132 and 136. Step 354 may thus including masking the insulating layer deposited in step 352 then depositing the material(s) for the turns 152 and 156. The mask may then be lifted off. The conductive materials in the apertures remains, forming turns 132 and 136. Alternatively, conductive material(s) may be deposited, a mask having apertures where the conductive material(s) are desired to be removed is then formed. The exposed portion of the conductive materials may then be removed. Thus, turns 132 and 136 are formed.

Another insulating layer is deposited, via step 356. Thus, the coils 132 and 136 are covered in an insulator. The turn(s) which do have a portion that extends further in the stripe height direction are provided, via step 358. Step 358 may include depositing the conductive material(s), providing a mask covering the region of the turn 134, then removing the exposed portion of the conductive material(s). Alternatively, a mask having an aperture in the place of the turn 134 may be provided, the conductive material(s) for the turn 134 deposited, and then the mask removed. Thus, the turn 134 is provided. Using the method 350, the coils 120, 120', 120", 120''', 120'''', 120''''', 130, 130', 130", 130''', 130'''', 130''''', 220, and/or 230 may be fabricated. Thus, the performance of the transducer 200 may be improved.

We claim:

1. A magnetic transducer having air-bearing surface (ABS) comprising:
    a write pole having a pole tip and a yoke;
    a coil for energizing the write pole and including a plurality of turns, a turn of the plurality of turns having a first portion and a second portion, the first portion having a first length in a stripe height direction substantially perpendicular to the ABS, the second portion having a second length in the stripe height direction, the second length being greater than the first length and extending to at least one adjacent turn of the plurality of turns; and
    an additional coil for energizing the write pole and including an additional plurality of turns, the write pole residing between the additional coil and the coil, an additional turn of the additional plurality of turns having a first additional portion and a second additional portion, the first additional portion having a first additional length in the stripe height direction, the second additional portion having a second additional length in the stripe height direction, the second additional length being greater than the first additional length and extending to at least one adjacent additional turn of the additional plurality of turns.

2. The magnetic transducer of claim 1 wherein the coil and the additional coil form at least one helical coil.

3. The magnetic transducer of claim 1 wherein the coil and the additional coil are pancake coils.

4. The magnetic transducer of claim 1 wherein the first portion of the turn of the plurality of turns has a first substantially rectangular cross section and wherein the second portion of the first turn has a second substantially rectangular cross section.

5. The magnetic transducer of claim 1 wherein the first portion has a first edge and a second edge, the first edge being between the second edge and the ABS and wherein the second portion extends over the first edge and the second edge.

6. The magnetic transducer of claim 5 wherein the second portion is substantially centered on the first portion.

7. The magnetic transducer of claim 1 wherein the second portion extends at least one-half way across the adjacent turn in the stripe height direction.

8. The magnetic transducer of claim 1 wherein each of the plurality of turns has a bottom surface proximate to the pole and wherein the bottom surface of the turn is further from the pole than the bottom surface of the adjacent turn.

9. The magnetic transducer of claim 1 wherein the turn includes a third portion having a third length in the stripe height direction, the third length being greater than the first length.

10. The magnetic transducer of claim 9 wherein the first portion is between the second portion and the third portion.

11. The magnetic transducer of claim 1 wherein the yoke has a length of not more than 4.5 microns.

12. The magnetic transducer of claim 1 further comprising:
    a shield, the coil residing between a portion of the shield and the write pole.

13. The magnetic recording transducer of claim 12 wherein the shield is a single piece shield.

14. The magnetic recording transducer of claim 1 further comprising:
    an aluminum oxide insulator for electrically insulating the coil from the write pole and one the plurality of turns from another of the plurality of turns.

15. The magnetic transducer of claim 1 wherein the write pole is a perpendicular magnetic recording pole.

16. The magnetic transducer of claim 1 wherein the magnetic transducer is an energy assisted magnetic recording transducer.

17. A magnetic transducer having air-bearing surface (ABS) comprising:
    a write pole including a pole tip and a yoke having a yoke length of not more than 4.5 microns;
    a plurality of coils for energizing the write pole, the plurality of coils including a first coil and a second coil, the first coil including a plurality of turns, a turn of the plurality of turns having a first portion and a second portion, the first portion having a first length in a stripe height direction substantially perpendicular to the ABS, the second portion having a second length in the stripe height direction, the second length being greater than the first length and extending to at least one-half way across at least one adjacent turn of the plurality of turns in the stripe height direction, the second coil including an additional plurality of turns, the write pole residing between the second coil and the first coil, an additional turn of the additional plurality of turns having a first additional portion and a second additional portion, the first additional portion having a first additional length in the stripe height direction, the second additional portion having a second additional length in the stripe height direction, the second additional length being greater than the first additional length and extending to at least one-half way across at least one adjacent additional turn of the additional plurality of turns;

a one-piece shield proximate to the ABS, the first coil residing between a portion of the one-piece shield and the write pole;

an aluminum oxide insulator for electrically insulating the first coil from the write pole and one the plurality of turns from another of the plurality of turns.

18. A disk drive comprising:

a media, a slider, and a magnetic transducer coupled with the slider, the magnetic transducer having air-bearing surface (ABS), a write pole, a coil for energizing the write pole and an additional coil, the write pole having a pole tip and a yoke, the coil including a plurality of turns, a turn of the plurality of turns having a first portion and a second portion, the first portion having a first length in a stripe height direction substantially perpendicular to the ABS, the second portion having a second length in the stripe height direction, the second length being greater than the first length and extending to at least one adjacent turn of the plurality of turns, the additional coil for energizing the write pole and including an additional plurality of turns, the write pole residing between the additional coil and the coil, an additional turn of the additional plurality of turns having a first additional portion and a second additional portion, the first additional portion having a first additional length in the stripe height direction, the second additional portion having a second additional length in the stripe height direction, the second additional length being greater than the first additional length and extending at least to at least one adjacent additional turn of the additional plurality of turns.

* * * * *